(12) United States Patent
Casper et al.

(10) Patent No.: US 7,515,532 B2
(45) Date of Patent: Apr. 7, 2009

(54) METHOD, SYSTEM, AND STORAGE MEDIUM FOR PREVENTING DUPLICATION AND LOSS OF EXCHANGES, SEQUENCES, AND FRAMES

(75) Inventors: Daniel Francis Casper, Poughkeepsie, NY (US); Casimer Maurice DeCusatis, Poughkeepsie, NY (US); John R. Flanagan, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 11/046,375

(22) Filed: Jan. 28, 2005

(65) Prior Publication Data

US 2006/0171301 A1 Aug. 3, 2006

(51) Int. Cl.
*H04J 14/02* (2006.01)
(52) U.S. Cl. .................... 370/227; 370/243; 398/5
(58) Field of Classification Search ............... 370/216, 370/227, 228, 389, 392, 394, 225, 226, 243, 370/246; 398/2, 5, 6, 7, 17, 18
See application file for complete search history.

(56) References Cited

U.S. PATENT DOCUMENTS

| | | | |
|---|---|---|---|
| 5,426,643 A | 6/1995 | Smolinske et al. | 370/105.3 |
| 5,570,202 A | 10/1996 | Shishido et al. | 358/405 |
| 5,631,896 A * | 5/1997 | Kawase et al. | 370/228 |
| 6,185,631 B1 * | 2/2001 | Casper et al. | 710/20 |
| 6,219,728 B1 * | 4/2001 | Yin | 710/52 |
| 6,240,446 B1 * | 5/2001 | Casper et al. | 709/213 |
| 6,338,083 B1 * | 1/2002 | Casper et al. | 709/213 |
| 6,430,617 B1 | 8/2002 | Britt et al. | 709/224 |
| 6,473,782 B1 * | 10/2002 | Casper et al. | 709/201 |
| 6,680,905 B1 * | 1/2004 | Ishikawa | 370/228 |
| 7,002,909 B2 * | 2/2006 | Hagopian et al. | 370/228 |
| 2001/0034788 A1 | 10/2001 | McTernan et al. | 709/232 |
| 2002/0083190 A1 | 6/2002 | Kamiya et al. | 709/236 |
| 2002/0152338 A1 * | 10/2002 | Elliott et al. | 710/34 |
| 2003/0206549 A1 | 11/2003 | Mody et al. | 370/390 |
| 2004/0052250 A1 | 3/2004 | Hu et al. | |

* cited by examiner

*Primary Examiner*—Wing F Chan
*Assistant Examiner*—Matthew Campbell
(74) *Attorney, Agent, or Firm*—Cantor Colburn LLP; Arthur Ortega (57) ABSTRACT

A sequence identification number is added to a header in each Generic Framing Procedure (GFP) frame. The byte sequence identification number identifies frames, preventing duplication or loss of exchanges, sequences, and frames. When this feature is enabled, a remote wavelength division multiplexing (WDM) node automatically checks the header to ensure that no duplication or loss occurs. The remote WDM node does not need to buffer data, instead the remote WDM node only needs to keep track of the sequence identification number information. A session identification number is also added to the header information, which allows the WDM node to keep track of which session was under way in the event that all connections between nodes across the WDM network are lost.

15 Claims, 6 Drawing Sheets

METHOD, SYSTEM, AND STORAGE MEDIUM FOR PREVENTING DUPLICATION AND LOSS OF EXCHANGES, SEQUENCES, AND FRAMES

BACKGROUND OF THE INVENTION

1. Field of the Invention

The present invention relates generally to network computing, communications protocols and, in particular, to fiber optics.

2. Description of Related Art

In recent years, the Fibre Channel Standard has emerged as a preferred protocol for data communication in enterprise storage area networks, disaster recovery applications, and other applications. Changes were made to the layer 4 protocols of Fibre Channel, resulting in the Fibre Connection (FICON) protocol for enterprise mainframe computers. Both of these protocols are currently used in servers and storage at data rates of 1 and 2 Gbit/s, with extensions to 4 Gbit/s and 8-10 Gbit/s in the near future. These protocols are often extended over distances in the 50-100 km range, and future applications are expected to further extend supported distances to several thousand km.

This channel extension is currently accomplished by using fiber optic wavelength division multiplexing (WDM) or dense wavelength division multiplexing (DWDM) equipment. Currently, channel extensions are provided over dark fiber, which is dedicated to a specific customer; in the near future, it will be provided by encapsulating the data into synchronous optical network (SONET) frames using standards such as Generic Framing Procedure (GFP). In either case, there is a concern with the potential for duplication or dropped frames on extended distance links. This concern applies to other protocols as well, including the InterSystem Channel (ISC) links used in a Parallel Sysplex, ESCON channels, and similar protocols. The ISC links that carry System Timer Protocol (STP) information also need to prevent duplicated or lost frames over extended distances.

Figure 1:
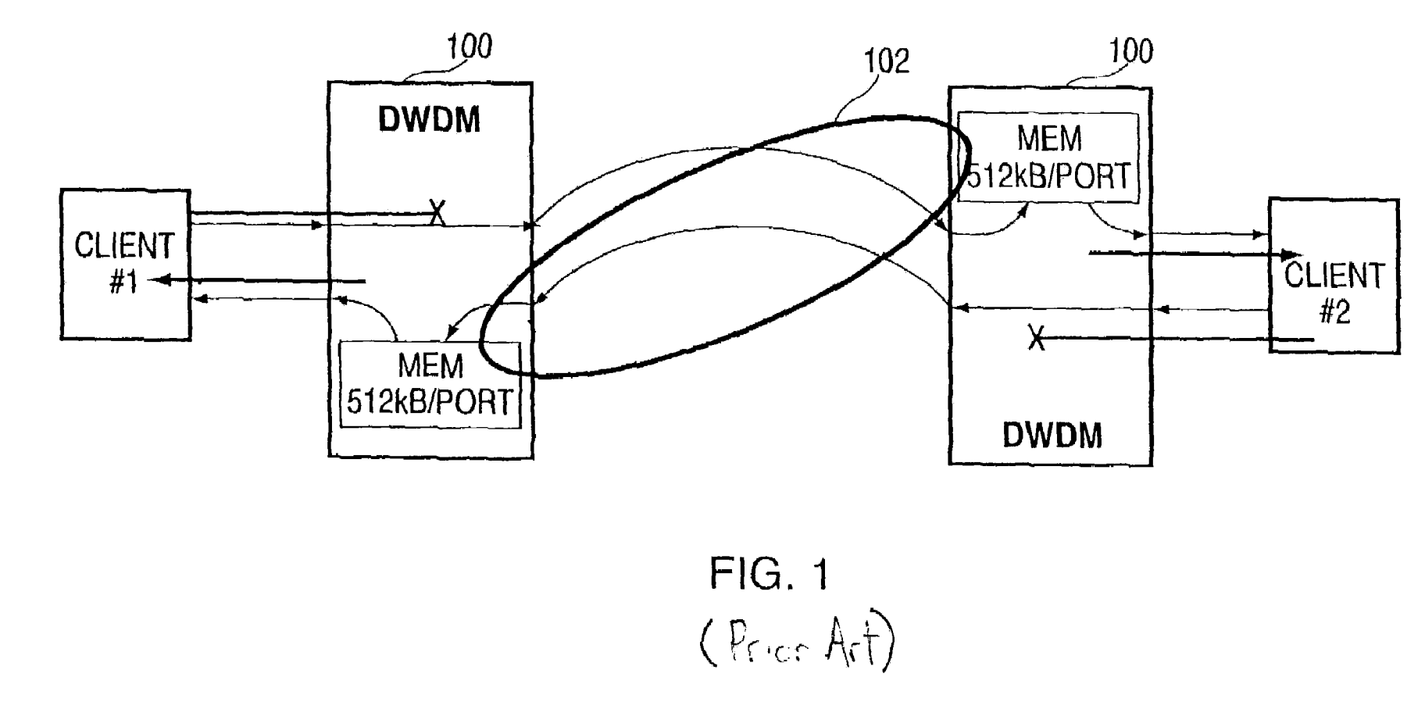
FIG. 1 is a block diagram showing a Fibre Channel extended buffer feature in the prior art.

FIG. 1 shows a Fibre Channel extended buffer feature in the prior art. There are links 102 (a/k/a fibers or paths) between two DWDMs 100. Typically, these links 102 are configured with a working path (a/k/a primary path) and a backup path (a/k/a secondary path or protection path) over a physically diverse route so that a break in the working path automatically causes a failover switch to the backup path. Typically, the same data is sent down both paths and selected by a protection switch at the receiving end of the link 102. In general, the two fibers are not of equal length. When the backup path is significantly longer than the working path, a significant amount of data may be in transmission over the longer fiber link, corresponding to a latency of about five microseconds per km, for example. If a fiber breaks on the working path, data frames that are still being transmitted over the backup path may arrive as duplicates at the receive end of the link. Similarly, some data frames may be lost during a protection switchover, which typically is about 50 ms long. Duplicate or lost frames are a significant problem in the Fibre Channel protocol; in the case of long links, entire sequences or exchanges may be duplicated, further complicating the problem.

BRIEF SUMMARY OF THE INVENTION

The present invention is directed to a method, system, and storage medium for preventing duplication and loss of exchanges, sequences, and frames.

One aspect is a method for preventing duplication and loss of exchanges, sequences, and frames. A sequence identification number and a session identification number are included in a header of each piece of data before transmitting it over a fiber optics network. The fiber optics network includes a working path and a backup path. The working path and the backup path have different lengths. Data received on the working and backup paths are both buffered at a destination node. When switching to the backup path from the working path, a piece of data is identified by its sequence identification number and session identification number. A storage medium may store instructions for performing this method.

Another aspect is a system for preventing duplication and loss of exchanges, sequences, and frames, including a first node, and a second node. The first node connects a first client to a fiber optics network. The fiber optics network includes a working path and a backup path that have different lengths. The second node connects a second client to the fiber optics network. The second node buffers data received on the working and backup paths. When switching to the backup path from the working path, a piece of data is identified by a sequence identification number and a session identification number in a header.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE INVENTION

Exemplary methods, systems, and storage mediums for preventing duplicated or lost frames in extended distance networks using Fibre Channel, FICON, ISC, STP, and similar protocols are described.

Figure 2:
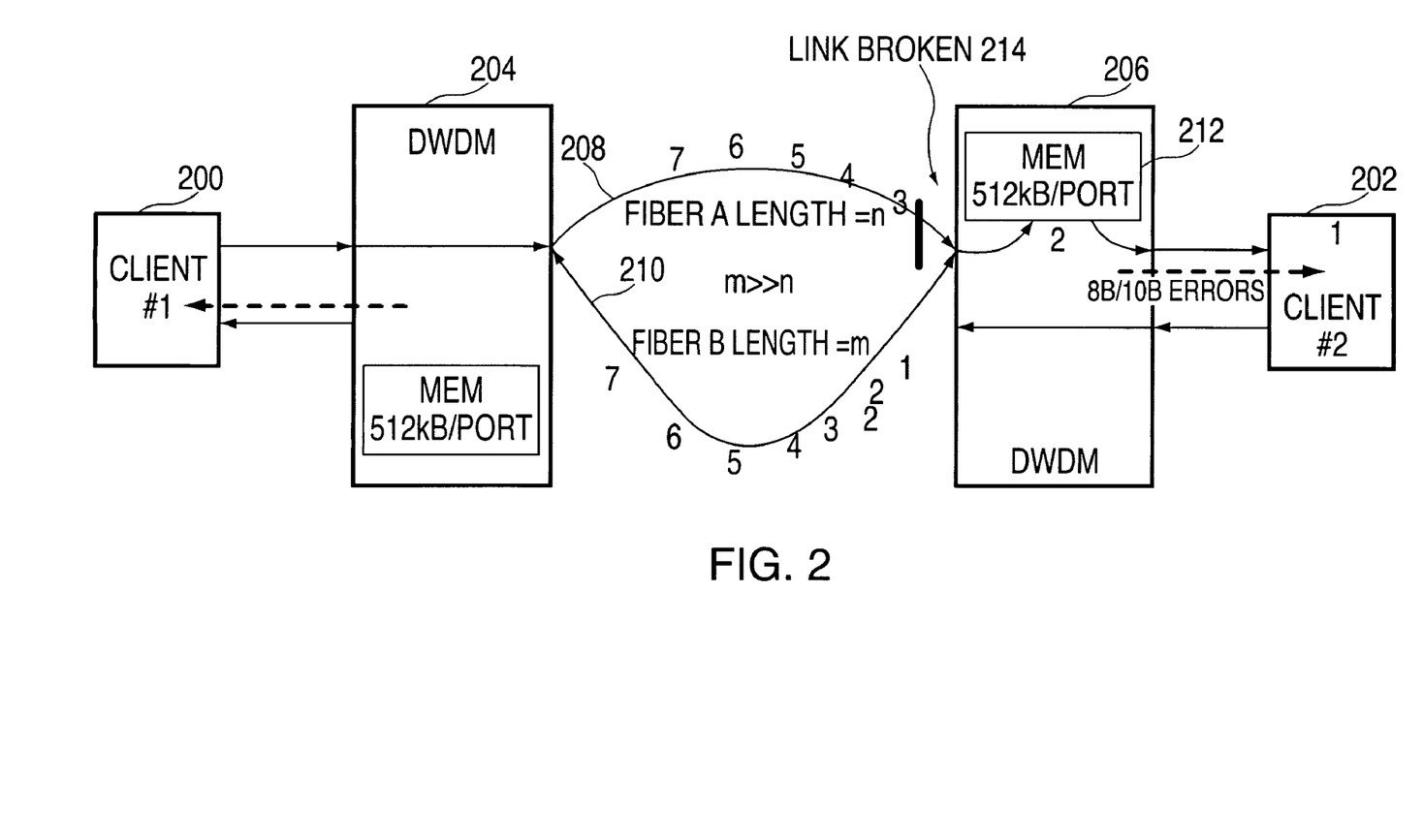
FIG. 2 is a block diagram showing the recovery of extended distance links over SONET according to exemplary embodiments.

FIG. 2 shows the recovery of extended distance links over SONET according to exemplary embodiments. A first client 200 is communicating with a second client 202. Typically, the clients are computer servers, but they may be any kind of client. A source DWDM 204 and a destination DWDM 206 form a network between the clients 200, 202. In FIG. 2, the network is a basic point-to-point network, however, a larger network may be used in other exemplary embodiments. The network includes a working path 208 and a backup path 210 and the working path 208 is shorter than the backup path 210. In FIG. 2, seven dataframes are shown flowing across each path. Over the longer backup path 210, all seven dataframes are in transmission. Over the shorter, working path 208, frame one has already arrived at the client 202, frame two has arrived at the DWDM 206 and is being held in memory 212, and frames three through seven are still in transmission. At this point, when some frames have already been received at the destination while other frames have not, there is a break 214 in the working path 208. In response to the break 214, a switch from the working path 208 to the backup path 210 may result in frame duplication or loss.

Figure 3:
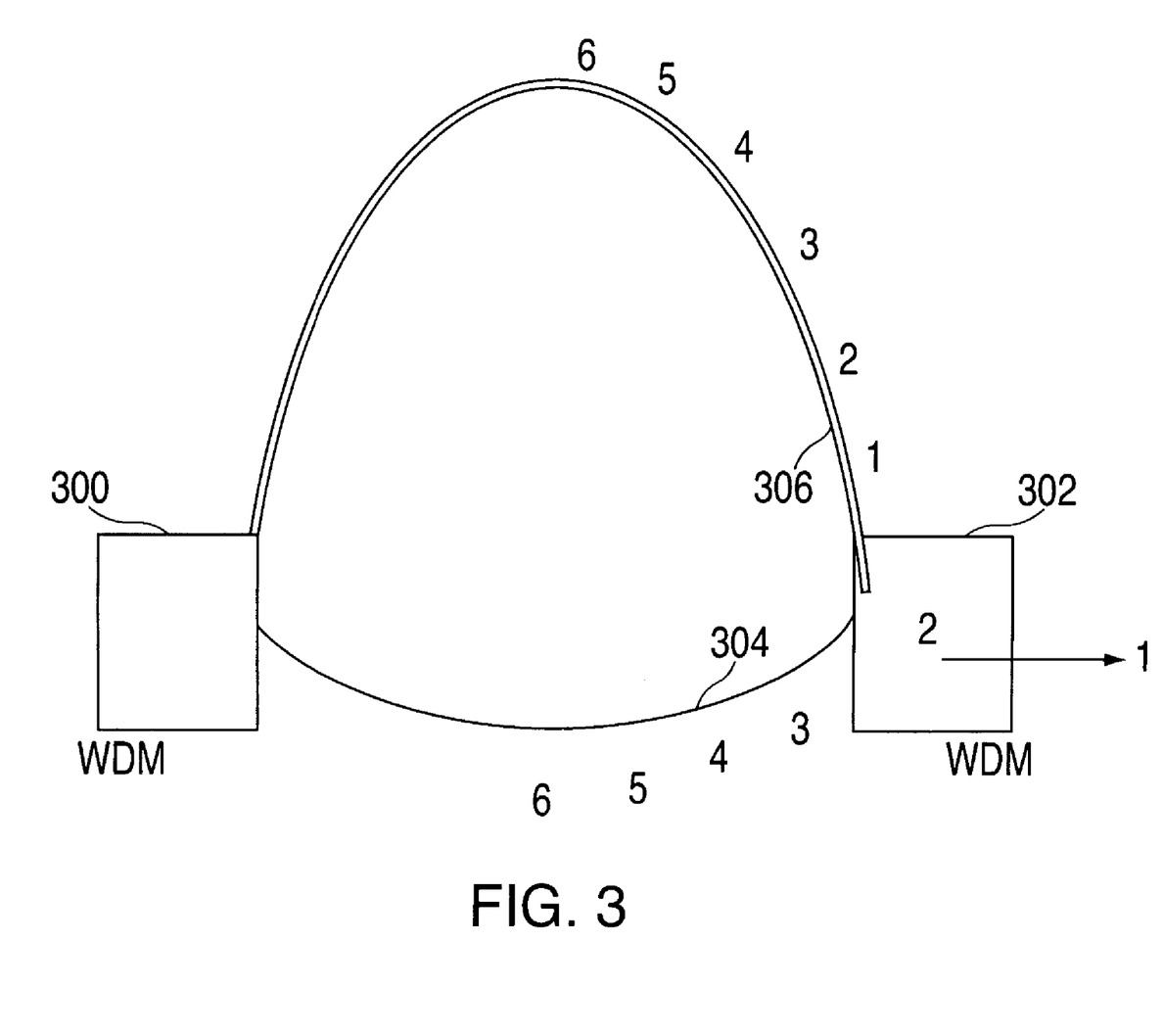
FIG. 3 is a block diagram illustrating how a switch from a shorter path to a longer path may result in frame duplication.

FIG. 3 illustrates how a switch from a shorter path to a longer path may result in frame duplication. Two WDM nodes 300, 302 are shown with a short path 304 and a long path 306 between them. Over the short path 304, frame one has arrived at the destination, frame two is being held by WDM node 302, and frames three through six are being transmitted. At this point, if the fiber breaks on the short path 304, duplicate copies of frames one and two on the long path 306 are still in transmission. Under these circumstances, using frames one and two would cause problems for high-level protocols, such as Fibre Channel Standard, ISC, and STP.

Multiple frames of data can be strung together to form blocks of data called sequences. Sequences can be strung together to form blocks of frames called exchanges. As the difference in length between two paths becomes larger, it is possible for more and more frames to be duplicated. Thus, it is possible for entire sequences or exchanges to be duplicated. Suppose, for example, that a computer on one end of a network is in communication with a storage device on the other end of the network. The computer sends commands for writing a piece of data into the storage and for a lock to gain exclusive access. These commands would typically be done with an exchange or two. If these commands were duplicated, the storage device would generate errors for the second request to write the data and for the second lock request. After receiving the errors, the computer may send more requests to write the data and more lock requests. Exemplary embodiments avoid this kind of situation.

Figure 4:
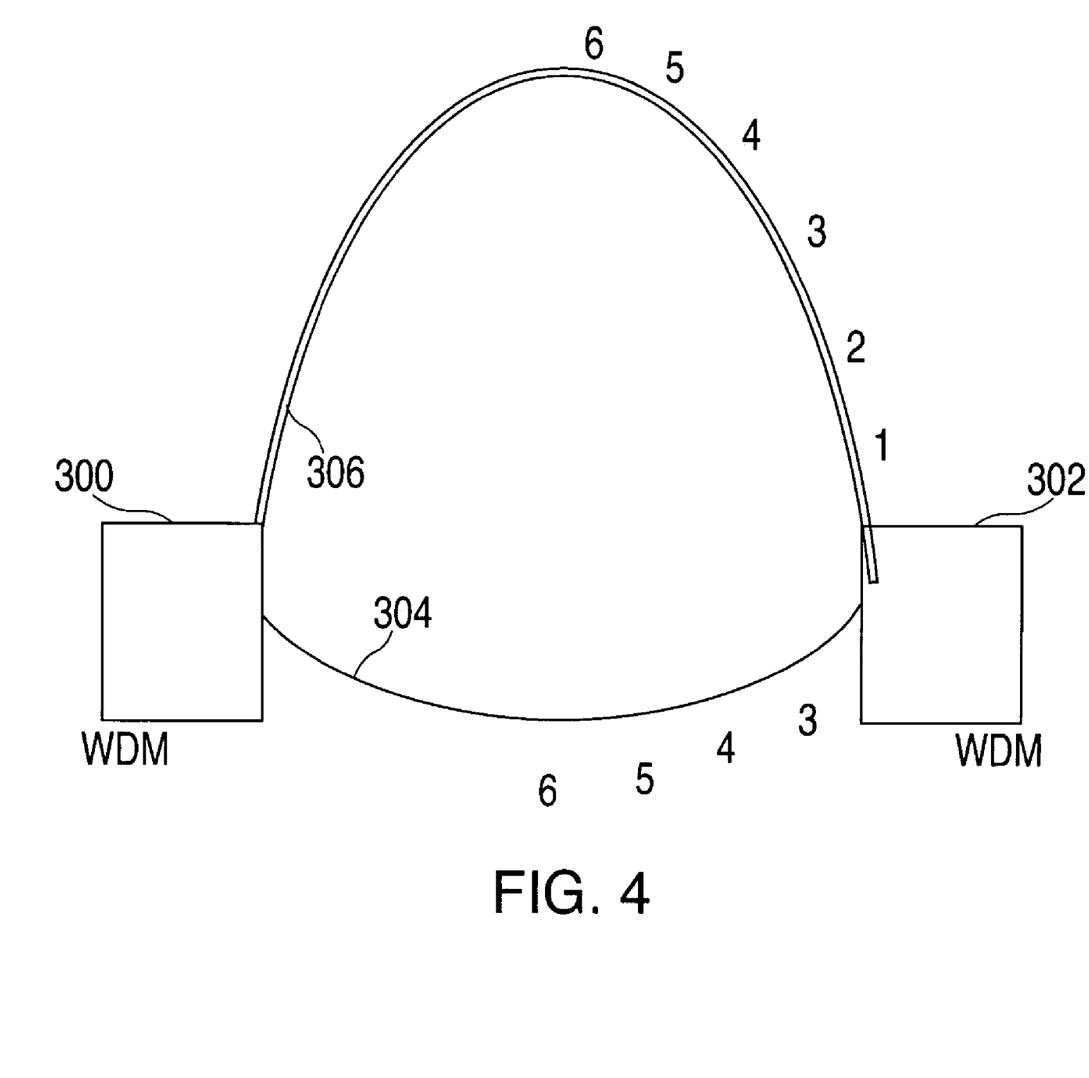
FIG. 4 is a block diagram illustrating how a switch from a longer path to a shorter path may result in frame loss.

FIG. 4 illustrates how a switch from a longer path 306 to a shorter path 304 may result in frame loss. Suppose the working path is the longer path 306 and the fiber is cut. Then, the working path is switched to the shorter path 304 (backup path). Over the longer path 306, frames one and two are still in transmission and have not yet reached the destination. Over the shorter path 304, frames one and two have already reached the destination and they would be lost when the paths are switched.

An exemplary method for preventing duplicated or dropped frames in extended distance networks uses Fibre Channel, FICON, ISC, STP, and similar protocols. An exemplary system uses GFP encapsulated SONET data, which will probably be used in many long distance applications. GFP is a standard called G.7041 from the International Telecommunications Union (ITU). GFP allows standard datacom protocols such as Fibre Channel to be encapsulated into a SONET or synchronous digital hierarchy (SDH) compliant frame structure, so they can be transported across installed SONET networks. Since there is a large amount of SONET infrastructure installed by telecom carriers and other service providers, GFP is a way to allow enterprise systems to carry data traffic over existing SONET networks at low incremental costs. This, in turn, enables channel extensions over hundreds of km for disaster recovery and other applications. Many wavelength division multiplexing (WDM) equipment manufacturers are adopting GFP transport.

Figure 5:
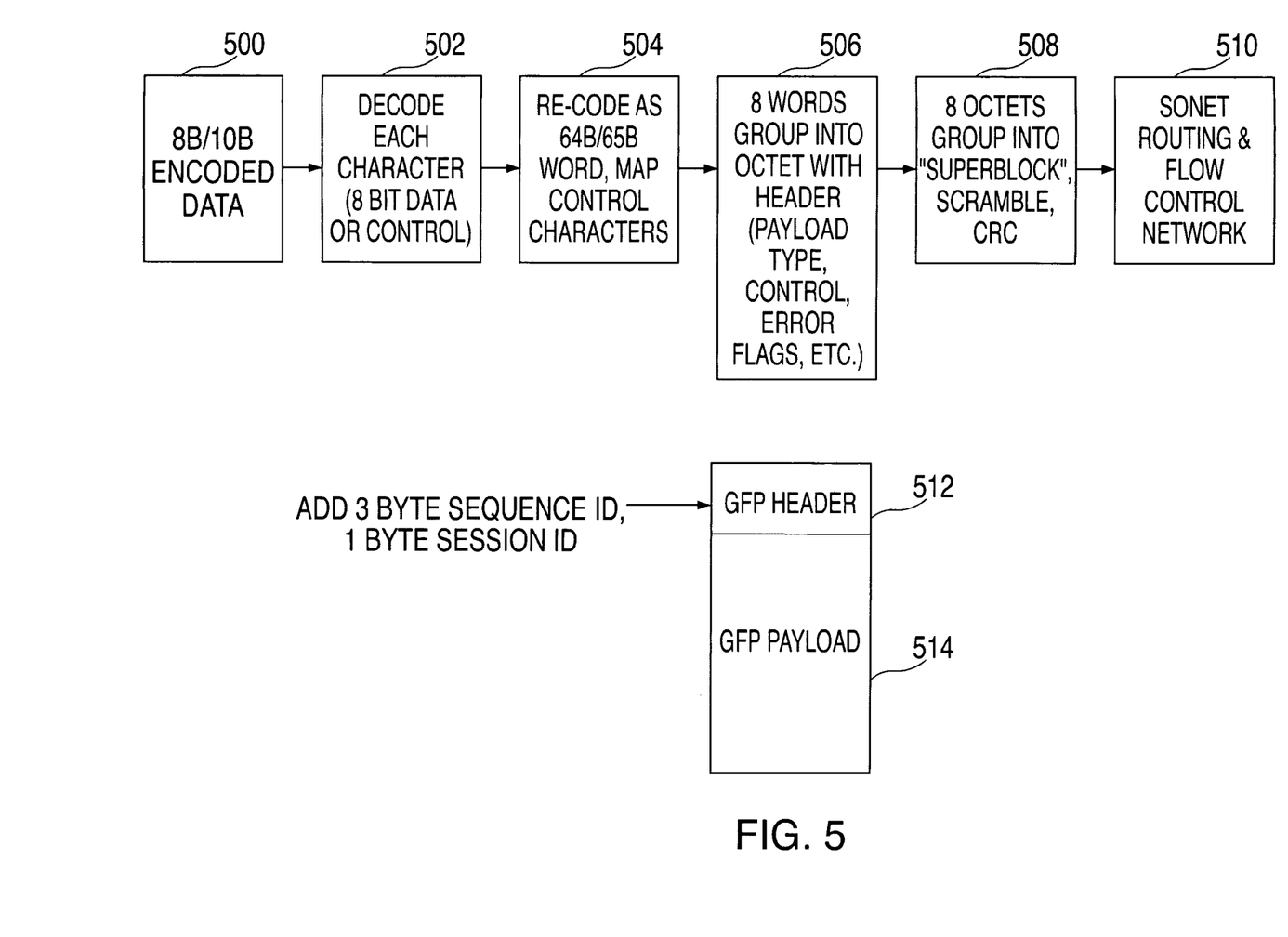
FIG. 5 is a flow chart of GFP and a block diagram of a header according to exemplary embodiments.

FIG. 5 shows the basic GFP procedure for protocols, such as ESCON that involve receiving an 8B/10B data sequence at 500, decoding each 10 bit character of the data sequence at 502, and mapping the result into either an 8-bit data character or a recognized control character at 504. This data is then re-encoded as a 64B/65B data sequence, with control characters mapped into a pre-determined set of 64/65B control characters at 506. In GFP terminology, the resulting data sequences or control characters are known as words. (This differs from the server definition of a word, which is usually taken as either a 4-byte quantity or a 40-bit string of four 8B/10B characters. GFP terminology is used in the following description.) A group of eight such words is assembled into an octet, which is provided with additional control and error flags. (This differs from the server definition of an octet, which is usually taken as an 8-bit byte.) A group of eight octets is then assembled into a superblock, scrambled, and a CRC error check field is added at 508. The resulting frames at 510 are signals that are compliant with routing through a SONET/SDH network flow control, including quality of service and related features. The original 8/10 encoded data is reassembled at the other end of the network.

FIG. 5 also shows a header 512 according to exemplary embodiments. The header 512 is associated with a payload 514. An exemplary embodiment adds at least a 3-byte sequence identification number (ID) to each GFP frame and a 1-byte session identification number (ID). These additions may be placed in any free space in the header, such as a reserved block.

The sequence ID is used to identify frames for the purposes of avoiding duplication or loss. In some embodiments, this approach is used to ensure in-order delivery of frames by applying the 3-byte header sequentially to each frame. This represents less than 0.4% overhead, assuming a structure with 16 superblocks per GFP frame. Preferably, the sequence ID is sufficiently large to allow determination of the proper frame sequence when the ID rolls over. The additional encoding is supported by network hardware on both ends of the link. The proper frame sequence is determined beforehand by using an existing inband management communication channel between WDM equipment. A WDM box at the head end of a link automatically determines whether its remote end supports duplicate/dropped frame detection or not.

Activation of the sequence ID feature in an exemplary embodiment can be done through software at the WDM management interface, without disruption of other data traffic in the network. The feature may be configured to briefly disable any network traffic when it is switched on or off, and to make a suitable entry in WDM management logs. Alternately, this feature may only be turned on when an extended distance link with protection is in use; for example, when other features such as buffer credit management are also enabled.

When the sequence ID feature is enabled in an exemplary embodiment, the remote WDM node automatically checks the additional header fields to ensure that no duplicate or dropped (lost) frames occur. In this exemplary embodiment, the remote WDM node does not need to buffer data; the remote WDM node only needs to keep track of the sequence ID header information. If a duplicate frame is detected, it is automatically discarded by the WDM equipment and normal traffic continues, but a log entry is made in the WDM network manager. This is not a traffic affecting alarm, unless more than a preset number of frames are duplicated in a given time interval. The WDM node replaces duplicated frames with Fibre Channel idle sequences in order to preserve the flow of data. Preferably, this does not cause any invalid frames to pass through to the subtended computer equipment. When a dropped frame is detected, an alarm is raised on the WDM console so that the user may take suitable action.

Figure 6:
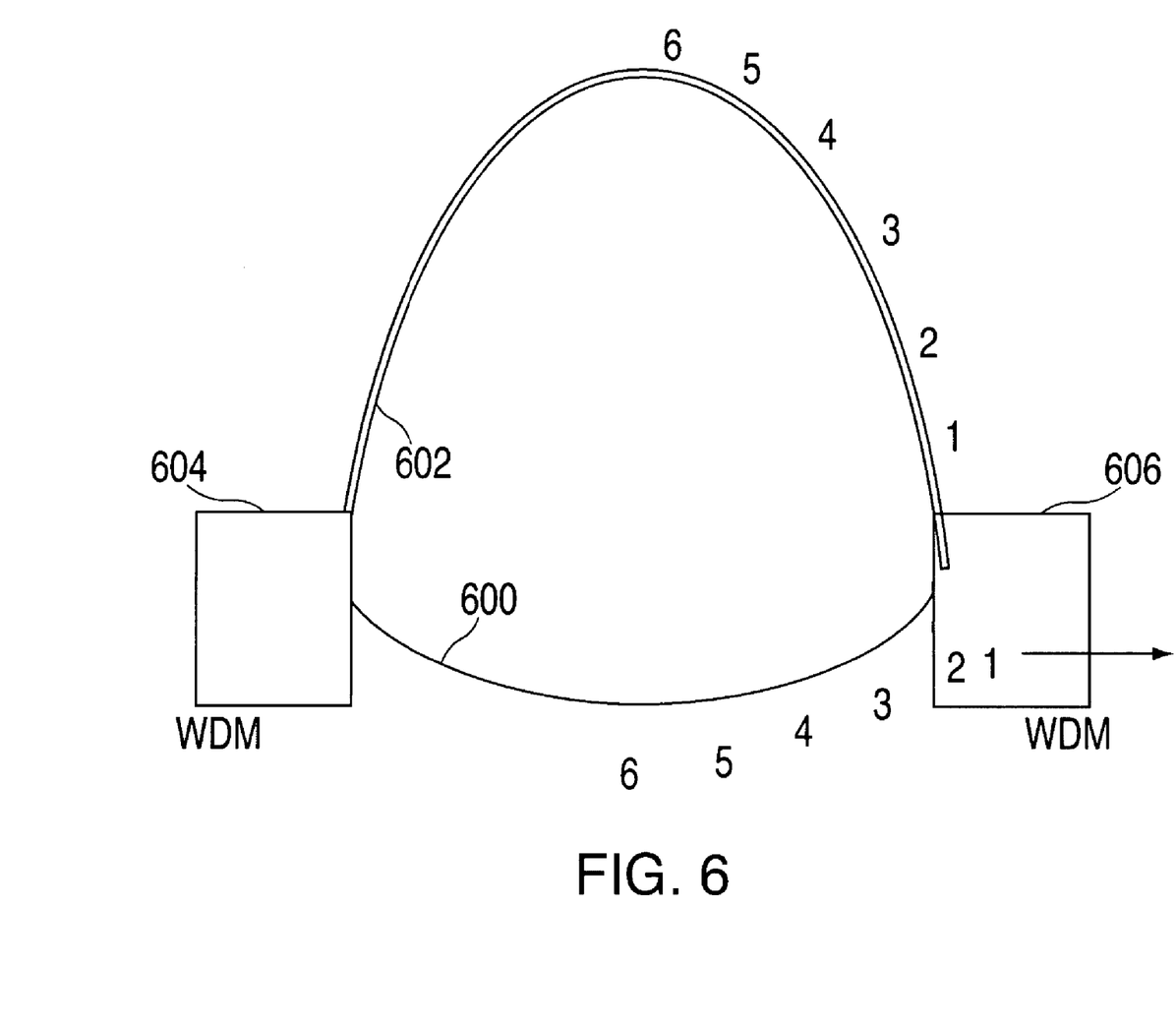
FIG. 6 is a block diagram illustrating an exemplary method for preventing frame duplication and loss.

FIG. 6 illustrates an exemplary method for preventing frame duplication and loss. A working path 600 and a backup path 602 are disposed between a source WDM 604 and a destination WDM 606. There is a buffer for both the working path 600 and the backup path 602 at the destination WDM

606. The buffer stores incoming data in the network equipment. The buffer is sized to hold on to data (i.e., a dataframe) that was received over the working path 600, until the same data is received over the backup path 602. Then, the data is handed off to the client at the destination. The buffer size depends on the difference in length between the two paths 600, 602. The buffering prevents duplicated frames. Combining buffering with counting sequence IDs prevents both duplication and loss. If any WDM 606 hardware failure or network failure occurs, the data in the buffer needs to be purged.

In another exemplary embodiment, the last N data frames are buffered in the WDM box at the receive end of the link, for transmission to the client in the event a dropped (lost) frame is detected. This recovery buffer is implemented on the receive paths of both links in a redundant pair (i.e., a protected WDM link). The data sequence ID numbers are used to identify frames, which are normally transmitted down both the working and backup data paths at the same time. The size of the sequence ID is increased from 3 to 4 bytes, where the first three bytes provide a sequence number and the last byte provides a session ID. In some embodiments, less than a full byte for the session ID, and one bit may be used to determine whether the sequence ID contains valid information. Of course, various other sizes may be used for sequence and session IDs.

This exemplary embodiment protects against duplication and loss when both working and protection links fail. When this happens, the WDM boxes drop light to both client sides and hold it off for approximately a channel timeout interval, according to the protocol. For FICON links, for example, the channel timeout interval is about 0.5 seconds. Then, the sequence and session ID are set to a new value so that when the link is re-established the start of a new session can be confirmed. An additional mechanism purges buffered data that does not match the new session ID in the event of a network failure, to avoid data integrity or security concerns. Preferably, session IDs are not reused, until all previous packets that used this ID have been purged from the network. In the event that both redundant links fail and connectivity is lost between the two ends of the network, a new session ID is established when connectivity returns and the sequence ID number restarts at zero or some predetermined value.

In this exemplary embodiment, while the sequence ID is checked, incoming data on both the working and protect paths is held in its respective recovery buffer. When data from the working path has been transmitted to its destination and discarded, the copy in the protection path's recovery buffer is also discarded, or if it has not arrived yet, it is discarded when it arrives, all based on the sequence number. In the event of a protection switch, frames may be dropped (if the switch occurs from a longer link to a shorter link) or frames may be duplicated (if the switch occurs from a shorter link to a longer link). Both of these conditions are prevented by the recovery buffers; when a switch occurs, data is taken from the recovery buffer with the next sequence ID and passed along to the clients. The buffer size is equal to the amount of data which can be stored in the largest allowed differential path length between the working and protect fibers, plus the maximum protection switch time, in this exemplary embodiment. In this way, it is not necessary to return to the transmitting end of the link in order to recover from a switch event or to re-validate the sequence of the data frames. The recovery buffers can also be used for other events; for example, the WDM box can be programmed to switch from the working to protect paths if the bit error rate on the working path exceeds a preset level. This exemplary embodiment could be implemented in conjunction with buffer credit management or spoofing techniques, which already buffer data within the WDM nodes.

In this exemplary embodiment, the sequence IDs are applied and checked not only for data frames, but also for various types of primitives and control sequences, such as the "R-RDY" commands, which determine when buffer credits are available to enable data transmission. Duplication of R-RDY commands is a particular problem for FICON or Fibre Channel links, as well as other protocols that use credit based flow control. If these primitives were lost or duplicated, it would cause an incorrect count of the available buffer credits on the link, which affects proper data flow. It may be desirable for other primitives, such as loss of light (LOL), to avoid being lost or duplicated as well. In one exemplary embodiment, handshake control sequences do not require sequence IDs, nor is does it apply a sequence identifier (ID) for every command in a repeating chain (for example, NOS) since this could use up the available sequence IDs. Preferably, in one exemplary embodiment, sequence identifiers for some types of primitives are included. In some exemplary embodiments, the recovery buffer is also used to recover corrupted frames that arrive on the working path. If a corrupted frame is detected, one exemplary embodiment locates the corresponding frame received on the backup path and substitutes the valid data. This effectively acts like a virtual protection switch for a single corrupted frame, and can occur very quickly; afterwards, the link may be provisioned to either return to the original working data path, or to switch permanently to the backup path.

These exemplary embodiments ensure that frames are received in order, so long as the GFP mapper in the WDM product applies the sequence ID header sequentially to all its received data blocks. If so, the detection of in-order frame delivery and detection of dropped/missing frames may both be implemented using the same logic in the WDM node. Note that since the same data is being transmitted along both the working and protect paths in the WDM network, it becomes possible to determine whether missing or lost frames are due to a protection switch event in the network, or due to some other reason. For example, changes in the SONET switch fabric, which are transparent to the end users, might become detectable as incidents of duplicated or dropped frames.

The exemplary embodiments of the present invention have many advantages. During protection switching between long and short fiber paths, frame duplication or loss is prevented by introducing sequence and session IDs and buffering received data on both working and backup paths. If both links are lost, frame duplication or loss is prevented by purging buffered data, dropping the link to clients for a timeout interval, and incrementing the session ID. Other features include allowing switchover for high bit error rates and other conditions, using the header to set a frame delivery priority, and modifying the header to estimate link latency for service level agreement (SLA).

As described above, the embodiments of the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code. For example, whether stored in a storage medium or loaded into and/or executed by a computer, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. Furthermore, various components may be implemented in hardware, software, or firmware or any combination thereof. Finally, many modifications may be made to adapt a particular situation or material to the teachings of the invention without departing from the essential scope thereof. Therefore, it is intended that the invention is not to be limited to the particular embodiment disclosed as the only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for preventing duplication and loss of exchanges, sequences, and frames, comprising:
   receiving data for transmission over a fiber optics network;
   decoding each piece of the data;
   re-encoding each piece of the data to include a Generic Framing Procedure header having a sequence identification number and session identification number;
   transmitting each piece of the data over the fiber optics network,
   the fiber optics network including a working path and a backup path, the working path and the backup path having different lengths;
   buffering the data received on the working path and buffering the data received on the backup path at a destination node, wherein an amount of the data buffered is dependent on a path length differential between the path lengths of the working path and the backup path;
   identifying each piece of the data by its sequence identification number and session identification number, when switching to the backup path from the working path;
   in response to a broken line in the working path, receiving the data from the backup path;
   checking the sequence identification number in the header for each piece of the data received on the working path and the backup path, wherein the sequence identification numbers are transmitted down the working path and the backup path at the same time;
   keeping track of the sequence identification number for each piece of data received on the working path and the backup path to determine at least one of a duplicate and a lost frame;
   in response to receiving a duplicate frame from the data from the backup path, discarding the duplicate frame from the data from the backup path;
   in response to losing a frame from the data from the working path, passing the frame from the data from the working path to its destination;
   in response to detecting a corrupted frame on the working path, locating a corresponding frame received on the backup path and substituting the corrupted frame with the corresponding frame; and
   in response to a bit error rate exceeding a preset level, switching to the backup path from the working path.

2. The method of claim 1, wherein the network connects at least two clients, the clients including a destination client, and further comprising:
   passing the buffered data having a particular sequence identification number to the destination client, when switching to the backup path from the working path.

3. The method of claim 1, further comprising:
   purging the buffered data and setting the session identification number, when communication links on both the working path and the backup path are lost.

4. The method of claim 3, further comprising:
   dropping light to a client for a channel timeout interval, when the communication links on both the working path and the backup path are lost.

5. The method of claim 1, further comprising:
   purging the buffered data after a failure, when no change has been made to the session identification number.

6. The method of claim 1, further comprising:
   initializing the sequence identification number to a predetermined value, after a failure.

7. The method of claim 1, further comprising:
   discarding the buffered data from the backup path having a same sequence identification number as the data from the working path that has been transmitted to its destination.

8. A system for preventing duplication and loss of exchanges, sequences, and frames, comprising:
   a first node for connecting a first client to a fiber optics network, the fiber optics network for transmitting data including a working path and a backup path, the working path and the backup path having different lengths; and
   a second node for connecting a second client to the fiber optics network, the second node buffering the data received on the working path and buffering the data received on the backup path, wherein an amount of the data buffered is dependent on a path length differential between the path lengths of the working path and the backup path;
   wherein each piece of the data is first decoded and then re-encoded to include a generic frame protocol header having a sequence identification number and a session identification number, each piece being identified by the sequence identification number and session identification number in a Generic Framing Procedure header, when switching to the backup path from the working path,
   wherein the sequence identification number of the header of the data received on the working path and the sequence identification number of the header of the data received on the backup path are checked to determine if there is at least one of a duplicate frame, a lost frame, a corrupted frame and a bit error rate exceeding a preset level to at least one of discard a duplicate frame from the data from the backup path in response to receiving a duplicate frame from the data from the backup path, pass a frame from the data from the working path to its destination in response to losing a frame from the data from the working path, locate a corresponding frame received on the backup path and substituting the corrupted frame with the corresponding frame in response to detecting the corrupted frame on the working path, and switching to the backup path from the working path in response to the bit error rate exceeding the preset value.

9. The system of claim 8, wherein the header for each piece of data includes a frame delivery priority.

10. The system of claim 8, wherein the header for each piece of the data is modified to estimate a link latency.

11. A computer-readable storage medium encoded with instructions for performing a method for preventing duplication and loss of exchanges, sequences, and frames, the method comprising:
- receiving data for transmission over a fiber optics network;
- decoding each piece of the data;
- re-encoding each piece of the data to include a Generic Framing Procedure header having a sequence identification number and session identification number;
- transmitting each piece of the data over the fiber optics network,
- the fiber optics network including a working path and a backup path, the working path and the backup path having different lengths;
- buffering the data received on the working path and buffering the data received on the backup path at a destination node, wherein an amount of the data buffered is dependent on a path length differential between the path lengths of the working path and the backup path;
- identifying each piece of the data by its sequence identification number and session identification number, when switching to the backup path from the working path;
- in response to a broken line in the working path, receiving the data from the backup path;
- checking the sequence identification number in the header for each piece of the data received on the working path and the backup path, wherein the sequence identification numbers are transmitted down the working path and the backup path at the same time;
- keeping track of the sequence identification number for each piece of data received on the working path and the backup path to determine at least one of a duplicate and a lost frame;
- in response to receiving a duplicate frame from the data from the backup path, discarding the duplicate frame from the data from the backup path;
- in response to losing a frame from the data from the working path, passing the frame from the data from the working path to its destination;
- in response to detecting a corrupted frame on the working path, locating a corresponding frame received on the backup path and substituting the corrupted frame with the corresponding frame; and
- in response to a bit error rate exceeding a preset level, switching to the backup path from the working path.

12. The storage medium of claim 11, wherein the network connects at least two clients, the clients including a destination client, and further comprising:
- passing buffered data having a particular sequence identification number to the destination client, when switching to the backup path from the working path.

13. The storage medium of claim 11, further comprising:
- purging the buffered data and setting the session identification number, when communication links on both the working path and the backup path are lost.

14. The method of claim 1 wherein the sequence identification number is at least three bytes.

15. The method of claim 14 wherein the session identification number is one byte.

* * * * *